United States Patent
Kalavakuru et al.

(10) Patent No.: US 12,212,350 B2
(45) Date of Patent: Jan. 28, 2025

(54) IMPROVING RADIO FREQUENCY (RF) PERFORMANCE BY OPTIMIZING TEMPERATURE IN AN ACCESS POINT (AP) ECOSYSTEM

(71) Applicant: Cisco Technology, Inc., San Jose, CA (US)

(72) Inventors: Sivadeep Reddy Kalavakuru, Akron, OH (US); Ardalan Alizadeh, Milpitas, CA (US); John Martin Blosco, Norton, OH (US); Peiman Amini, Fremont, CA (US); Clark Carty, Brunswick, OH (US)

(73) Assignee: Cisco Technology, Inc., San Jose, CA (US)

( * ) Notice: Subject to any disclaimer, the term of this patent is extended or adjusted under 35 U.S.C. 154(b) by 325 days.

(21) Appl. No.: 17/822,811

(22) Filed: Aug. 29, 2022

(65) Prior Publication Data

US 2024/0072828 A1 Feb. 29, 2024

(51) Int. Cl.
*H04B 1/036* (2006.01)
*H04W 52/20* (2009.01)
*H04W 52/30* (2009.01)

(52) U.S. Cl.
CPC ............ *H04B 1/036* (2013.01); *H04W 52/20* (2013.01); *H04W 52/30* (2013.01)

(58) Field of Classification Search
CPC . H04B 1/036; H04B 2001/045; H04W 52/20; H04W 52/30
See application file for complete search history.

(56) References Cited

U.S. PATENT DOCUMENTS

| | | | | |
|---|---|---|---|---|
| 8,547,164 B2* | 10/2013 | Flores | ................. | G06F 11/1064 327/513 |
| 9,360,907 B2* | 6/2016 | Doshi | ..................... | G06F 1/324 |
| 9,484,892 B1* | 11/2016 | Kakoee | .................. | H03K 3/011 |
| 9,813,075 B1* | 11/2017 | Chao | ........................ | H03M 1/06 |
| 10,509,450 B1 | 12/2019 | Sun et al. | | |
| 10,819,290 B2* | 10/2020 | Ranta | .................. | H03F 3/45076 |
| 10,873,308 B2* | 12/2020 | Ranta | .................. | H03G 3/3036 |
| 11,356,133 B1* | 6/2022 | Hasnain | ................ | H04L 25/022 |
| 11,586,272 B2* | 2/2023 | Kalyanam | ............. | G06F 1/3287 |
| 11,714,481 B2* | 8/2023 | Lattrel | .................. | G06F 1/3296 713/320 |
| 2007/0263856 A1 | 11/2007 | Parsa | | |
| 2020/0280860 A1 | 9/2020 | Egner et al. | | |
| 2020/0336226 A1 | 10/2020 | Desai et al. | | |
| 2020/0387204 A1 | 12/2020 | McFarland et al. | | |
| 2021/0258804 A1* | 8/2021 | Amini | ................... | H04W 24/02 |

FOREIGN PATENT DOCUMENTS

CN 105371964 B * 8/2018

* cited by examiner

*Primary Examiner* — Ahmed Elallam
(74) *Attorney, Agent, or Firm* — Merchant & Gould P.C.

(57) ABSTRACT

Improved Radio Frequency (RF) performance by optimizing temperature may be provided. A plurality of heatmaps may be created associating a plurality of component heat characteristics, of a plurality of components of a device, with a plurality of pre-defined performance trade-off states. Next, a shortest path through the plurality of pre-defined performance trade-off states may be determined. The device may then be placed in successive ones of the plurality of pre-defined performance trade-off states according to the determined shortest path until a Transmit (TX) performance target is met.

20 Claims, 7 Drawing Sheets

| Modulation | Rate (R) | Minimum Sensitivity (20 MHz PPDU) (dBm) | Minimum Sensitivity (40 MHz PPDU) (dBm) | Minimum Sensitivity (80 MHz PPDU) (dBm) | Minimum Sensitivity (160 MHz PPDU) (dBm) | Minimum Sensitivity (320 MHz PPDU) (dBm) |
|---|---|---|---|---|---|---|
| 1024-QAM | 3/4 | -54 | -51 | -48 | -45 | -42 |
| 1024-QAM | 5/6 | -52 | -49 | -46 | -43 | -40 |
| 4096-QAM | 3/4 | -49 | -46 | -43 | -40 | -37 |
| 4096-QAM | 5/6 | -46 | -43 | -40 | -37 | -34 |

| | Key IC Components | | | | | Housing Surface | | | |
|---|---|---|---|---|---|---|---|---|---|
| Components | 2GPA | 5GPA | 6GPA | Scanning Radio | Scanning FEMs | Top Cover (Plastic) | Bottom Cover (Plastic) | Ambient Temperature | Measured Power |
| IC Limit(°C) | Tj:150 | Tj:150 | Tj:150 | *Tj:110 | Tj:150 | Tc:95 | Tc:95 | | |
| TIM to BTM | | | | 6.5/6.5 | | | | | |
| TIM to Reflector | 1 | 1 | 1 | 6.5 | 1 | | | | |
| V1@Ta=50C (6G: 4x4+5G: 4x4+2G: 4x4/5G Ethernet) | | | | | | | | | |
| TC(°C) | 103 | 106.3 | 110.3 | 96.7 | 95.6 | 69.5 | 85.1 | 49.1 | 53.63*0.625=33.5 (Include USB) |
| TJ(°C) | 106.9 | 124.7 | 132.7 | 97.6 | 98.1 | | | | |
| Thermal Margin | 43.1 | 45.3 | 17.3 | 7.4 | 51.9 | 25.5 | 9.9 | | |
| V2@Ta=50C (6G: 4x4+5G: 4x4+2G: 2x2/5G Ethernet) | | | | | | | | | |
| TC(°C) | 98.3 | 104.6 | 97.2 | 90.9 | 89.6 | 68.1 | 81.4 | 49.8 | 53.88*0.572=30.8 (Include USB) |
| TJ(°C) | 102.2 | 123 | 119.6 | 91.8 | 92.1 | | | | |
| Thermal Margin | 47.8 | 47 | 30.6 | 13.2 | 57.9 | 26.9 | 13.6 | | |
| V3@Ta=50C (6G: 4x4+5G: 2x2+2G: 2x2/5G Ethernet) | | | | | | | | | |
| TC(°C) | 91.9 | 96.3 | 92.7 | 87 | 86.4 | 65.8 | 78.3 | 48.9 | 54.08*0.508=27.5 (Include USB) |
| TJ(°C) | 95.8 | 114.7 | 115.1 | 87.9 | 88.9 | | | | |
| Thermal Margin | 54.2 | 55.3 | 34.9 | 17.1 | 61.1 | 29.2 | 16.7 | | |
| V4@Ta=50C (6G: 2x2+5G: 2x2+2G: 2x2/2.5G Ethernet) | | | | | | | | | |
| TC(°C) | 88.1 | 92.6 | 86.5 | 84.8 | 83.1 | 62.6 | 74.5 | 49.8 | 54.26*0.457=24.8 (Include USB) |
| TJ(°C) | 92 | 111 | 108.9 | 85.7 | 85.6 | | | | |
| Thermal Margin | 58 | 59 | 41.1 | 19.3 | 64.4 | 32.4 | 20.5 | | |

IMPROVING RADIO FREQUENCY (RF) PERFORMANCE BY OPTIMIZING TEMPERATURE IN AN ACCESS POINT (AP) ECOSYSTEM

TECHNICAL FIELD

The present disclosure relates generally to improving Radio Frequency (RF) performance by optimizing temperature.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Improved Radio Frequency (RF) performance by optimizing temperature may be provided. A plurality of heatmaps may be created associating a plurality of component heat characteristics, of a plurality of components of a device, with a plurality of pre-defined performance trade-off states. Next, a shortest path through the plurality of pre-defined performance trade-off states may be determined. The device may then be placed in successive ones of the plurality of pre-defined performance trade-off states according to the determined shortest path until a Transmit (TX) performance target is met.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

With the advent of Wi-Fi 6 and Wi-Fi 7, it may be expected for Access Points (APs) to support up to 16 Transmit (TX)/Receive (RX) chains. Moving to a higher number of radios operating at higher Quadrature Amplitude Modulation (QAM) (e.g., 1K QAM or 4K QAM) may be beneficial from the perspective of improving system throughput, serving a higher number of clients, and TX/RX diversity for example. In order to sustain higher QAMs, radios may need to be operating at a high linearity point with, for example, less than $-40$ dB Error Vector Magnitude (EVM). EVM of Front-End Modules (FEM) (e.g., of Power Amplifiers (PA)) may become distorted at higher temperatures (e.g., at indoor 50 degree Celsius, EVM may degrade $-2$ dB to $-3$ dB across Modulation Coding Schemes (MCS)) as compared to room temperatures. This may result in connectivity issues and suboptimal performance for some client devices in a WLAN. Accordingly, embodiments of the disclosure may improve RF performance (e.g., EVM) by optimizing Access Point (AP) temperature with a high level view of an ecosystem inside the AP.

Figure 1:
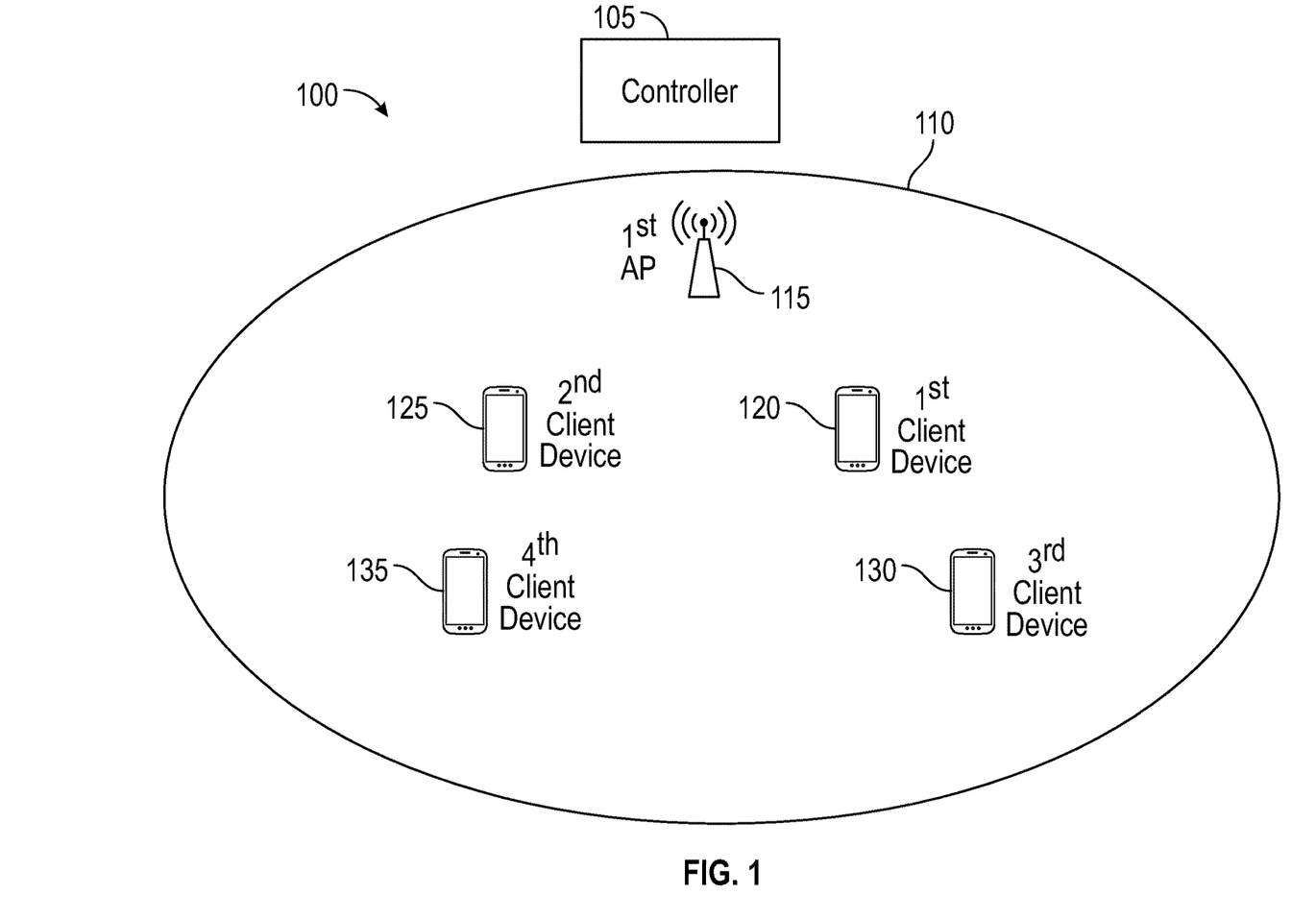
FIG. 1 is a block diagram of an operating environment for improving Radio Frequency (RF) performance by optimizing temperature.

FIG. 1 shows an operating environment 100 for improving Radio Frequency (RF) performance by optimizing temperature. As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN for client devices). The plurality of APs may include, but are not limited to, a first AP 115 in addition to other APs. The plurality of APs may provide wireless network access to a plurality of client devices as they move within coverage environment 110. The plurality of client devices may comprise, but are not limited to, a first client device 120, a second client device 125, a third client device 130, and a fourth client device 135. Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, Virtual Reality (VR)/Augmented Reality (AR) devices, or other similar microcomputer-based device. Each of the plurality of APs and the plurality of client devices may be compatible with specification standards such as, but not limited to, the Institute of Electrical and Electronics Engineers (IEEE) 802.11ax/be specification standard for example.

Controller 105 may comprise a Wireless Local Area Network Controller (WLC) and may provision and control coverage environment 110 (e.g., a WLAN). Controller 105 may allow first client device 120, second client device 125, third client device 130, and fourth client device 135 to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to improve Radio Frequency (RF) performance by optimizing temperature.

The elements described above of operating environment 100 (e.g., controller 105, first AP 115, first client device 120, second client device 125, third client device 130, or fourth client device 135) may be practiced in hardware and/or in software (including firmware, resident software, microcode, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 6, the elements of operating environment 100 may be practiced in a computing device 600.

Figure 2:
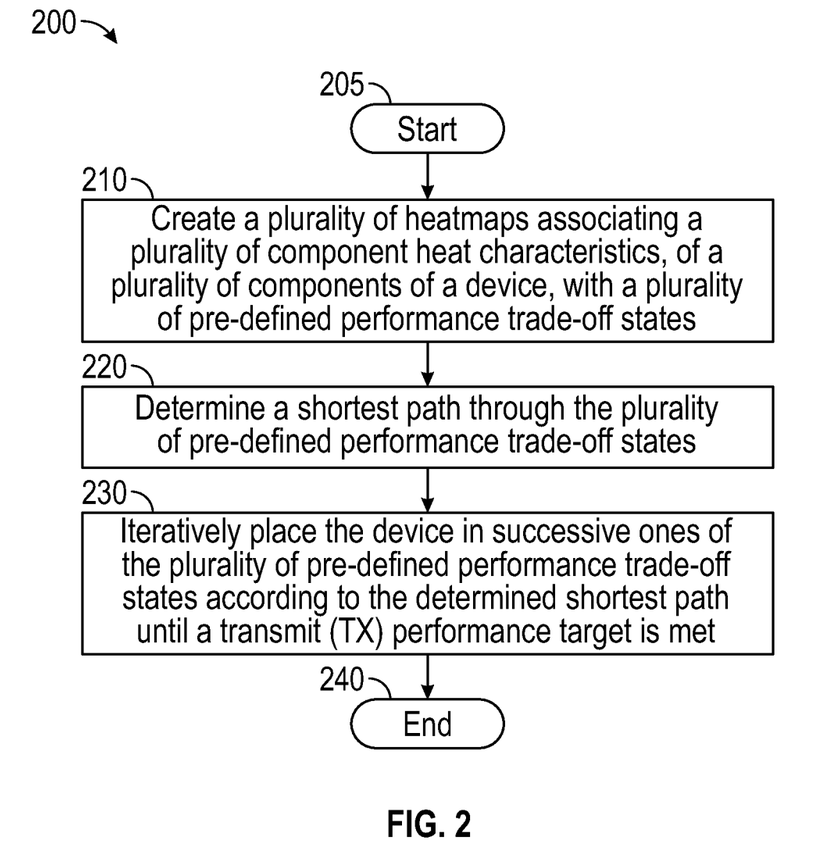
FIG. 2 is a flow chart of a method for improving RF performance by optimizing temperature.

FIG. 2 is a flow chart setting forth the general stages involved in a method 200 consistent with an embodiment of the disclosure for improving Radio Frequency (RF) performance by optimizing temperature. Method 200 may be implemented using, for example, first AP 115 or controller 105 as described in more detail above with respect to FIG. 1. Ways to implement the stages of method 200 will be described in greater detail below.

Wi-Fi 7 may scale the Physical Layer (PHY) of previous Wi-Fi standards, for example, by doubling both the bandwidth and the number of Spatial Streams (SS) in Multi User-Multiple Input Multiple Output (MU-MIMO), which may increase the throughput (e.g., 2×2=4 times). The PHY may also introduce higher-rate MCSs by utilizing 4K QAM that may add, for example, 20% to the throughput. Accordingly, Wi-Fi 7 may provide up to 2×2×1.2=4.8 times higher data rates compared, for example, with 9.6 Gbps of Wi-Fi 6.

Figure 3:
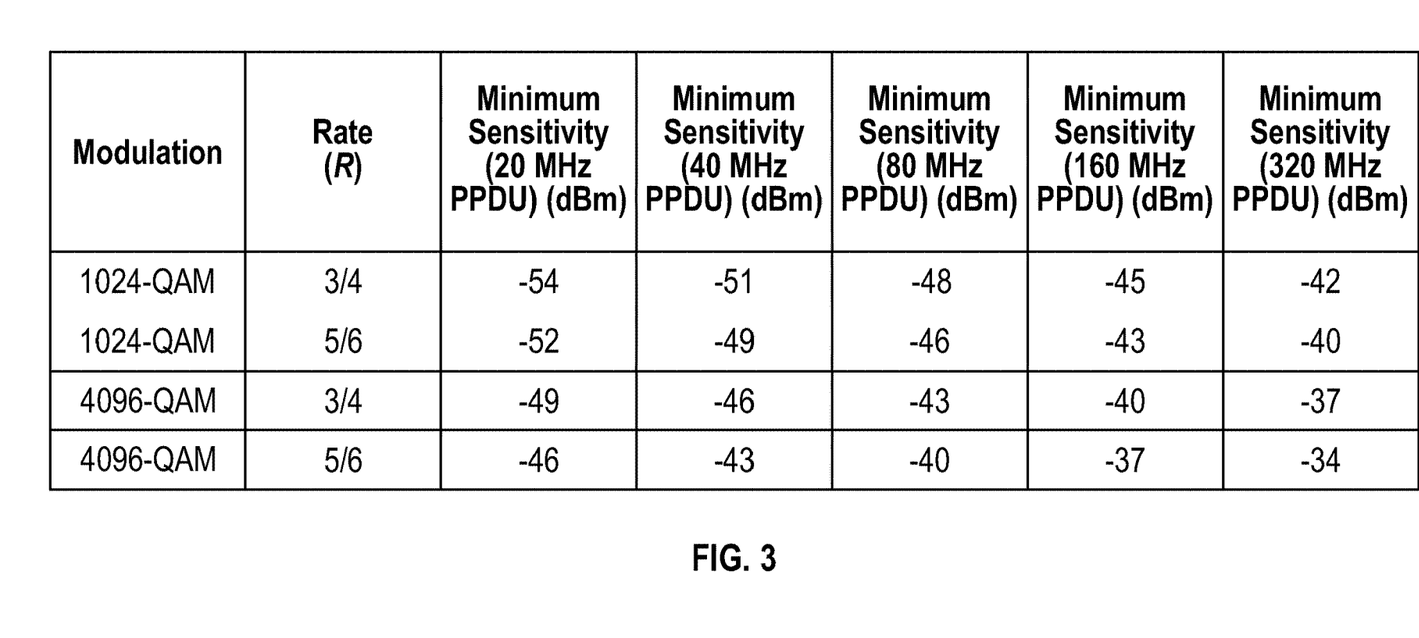
FIG. 3 illustrates receiver minimum input power sensitivity.

The Signal-to-Noise Ratio (SNR) needed at a receiver side to accept 4096 QAM may be more than 40 dB (e.g., or equivalently EVM>−40 dB), which may be too high for a conventional Wi-Fi scenario. FIG. 3 illustrates receiver minimum input power sensitivity. As shown in FIG. 3, sensitivity requirements of higher QAMs may become tight.

Figure 4A:
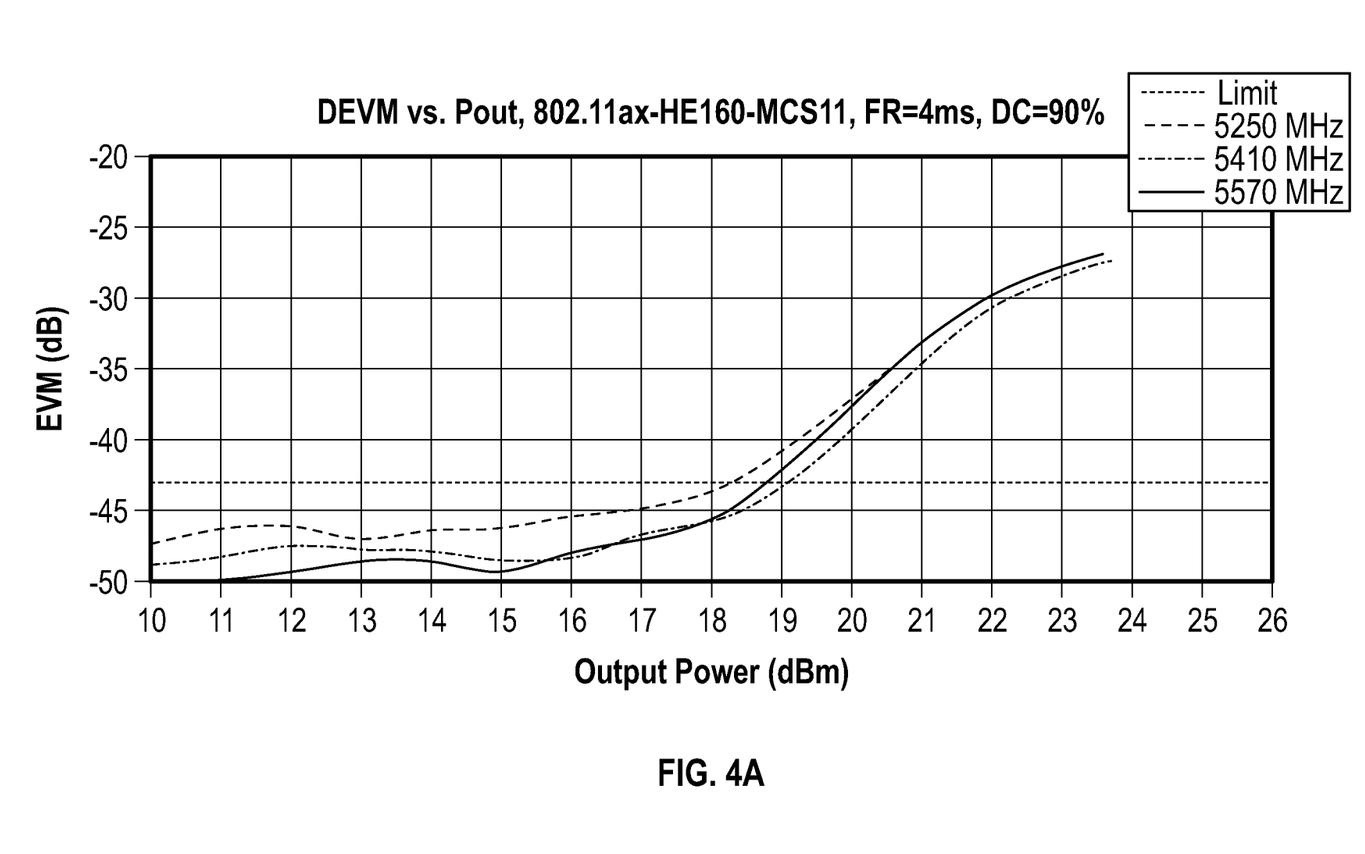
FIG. 4A illustrates Error Vector Magnitude (EVM) versus Output Power at 25 degrees Celsius.
Figure 4B:
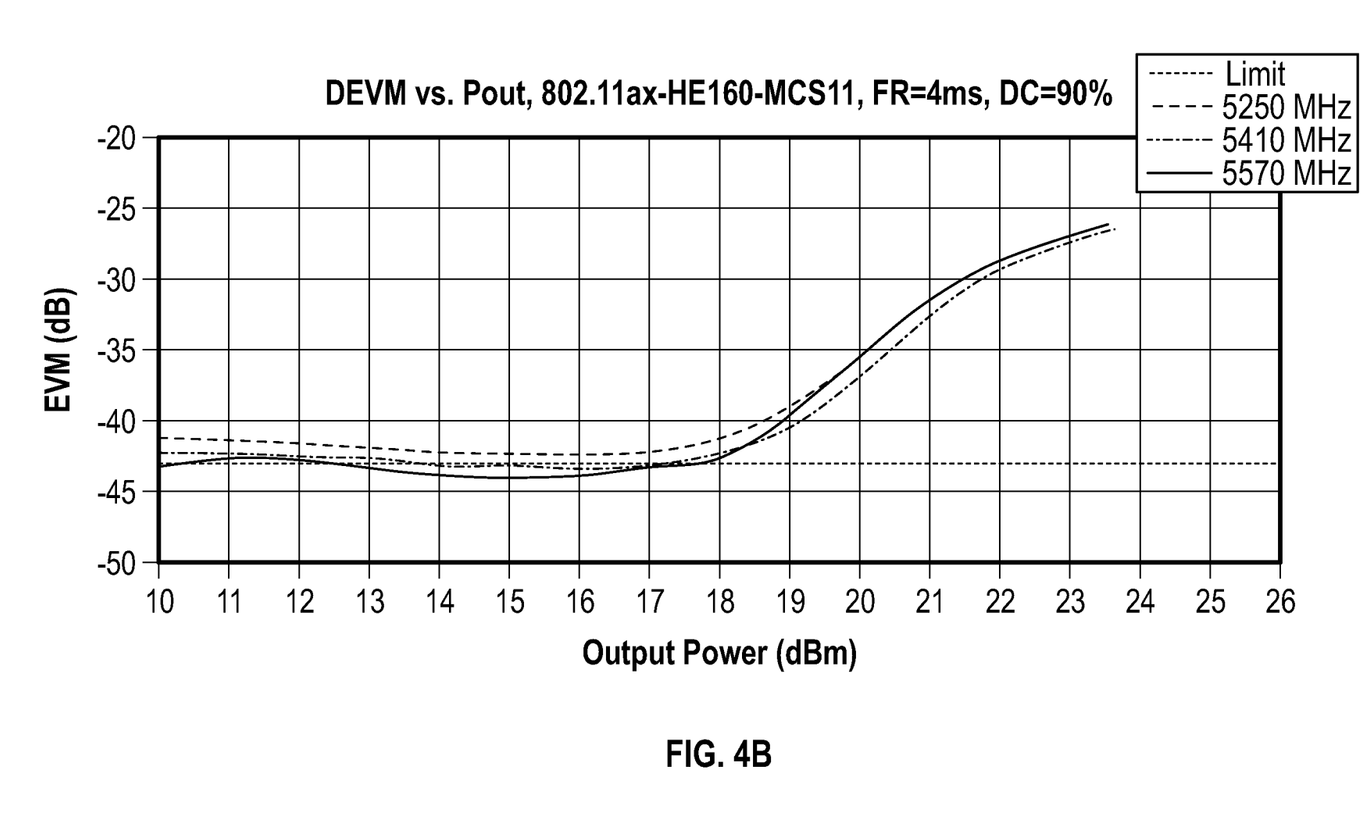
FIG. 4B illustrates EVM versus Output Power at 85 degrees Celsius.

Power amplifier accuracy may be temperature dependent. In general, AP radios may transmit power based on power tables with EVM roll backs. FIG. 4A illustrates EVM versus output power at 25 degrees Celsius. FIG. 4B illustrates EVM versus output power at 85 degrees Celsius. Embodiments of the disclosure may consider TX-power-based EVM limitations over data rate and temperature based on a worst case.

As shown in FIG. 4A and FIG. 4B, EVM may stay below −45 dB when a Power Amplifier's (PA) temperature is 25 degrees Celsius for a 10 dBM to 18 dBM TX power range while the best EVM that may be achieved in 85 degrees Celsius may be about 42 dB in the same range of TX power. Accordingly, embodiments of the disclosure may improve RF performance (e.g., TX EVM) by optimizing temperature inside an AP (e.g., first AP 115) in multiple places.

Method 200 may begin at starting block 205 and proceed to stage 210 where a computing device (e.g., first AP 115 or controller 105) may create a plurality of heatmaps associating a plurality of component heat characteristics, of a plurality of components of a device (e.g., first AP 115), with a plurality of pre-defined performance trade-off states. For example, multiple temperature sensors may be embedded onboard first AP 115 for throttling to make sure that the hardware is not exceeding the maximum temperature during operation. The temperature sensors may be placed on (or near), but not limited to, a Base Band (BB) Chip, a Radio Frequency Integrated Circuit (RFIC), a Physical Layer (PHY) chip, a memory chip, a Power Amplifier (PA), and a Power Management Integrated Circuit (PMIC). These temperature sensors may provide a high level view to optimize and to improve degraded functionality over temperature. Accordingly, heatmaps may be created of the AP ecosystem using these temperature sensors. In addition, embodiments of the disclosure may use the predicted ambient temperature based on internal sensors as the body temperature.

Temperature data may be gathered, for example, from the following components at their respective configuration. Heat generation of each component may be characterized based on operating conditions. The components from which data is gathered may comprise primary sources of heat and functionality. The components may comprise, but not limited to: PHY— 5G/2.5G/1G (with traffic; Scheduler set Duty cycle for each mode); ii) BB chip (Mission Mode: 25/50/75/85% Central Processing Unit (CPU) utilization); iii) service and auxiliary radios (2.4/5/6 GHz—1×1/2×2/4×4/8×8); and iv) memory and PMIC during the aforementioned operations.

Heatmaps may be created of first AP 115 for each configuration described above. Current mode of radio operation may be identified (TX×RX: SS at MCS/EVM) for each client associated per radio. Pre-define performance trade-off states may be identified (e.g., PHY at 2.5G vs 1G) that may be applicable for user scenarios in particular instances for all components surrounding a Point of Interest (POI) (e.g., POI of TX RF performance of 6 GHz radio). Based on the above data, available opportunities may be understood to optimize and to improve degraded functionality (e.g., TX linearity) over temperature.

Figure 5:
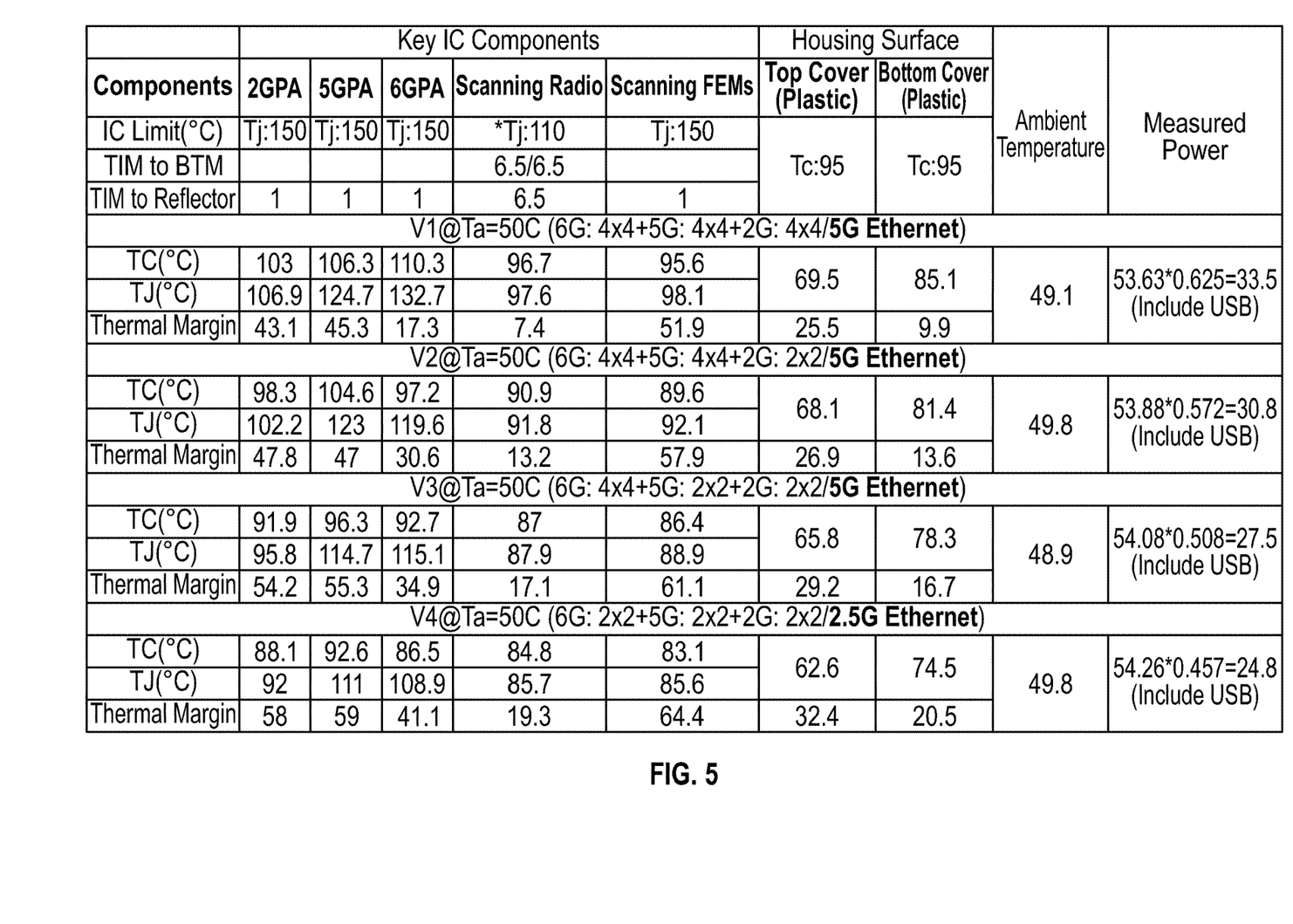
FIG. 5 illustrates measured case temperature (Tc) and operating junction temperature (Tj) at key RF Power Amplifier (PA) components.

FIG. 5 illustrates measured case temperature (Tc) and operating junction temperature (Tj) at key RF Power Amplifier (PA) components at a pre-define performance trade-off states (e.g., V1, V2, V3, and V4). Operating at pre-define performance trade-off states may lead to direct improvement in TX RF performance (e.g., throughput, TX linearity-gain, EVM (MCS (7-13)), mask, and Peak-to-Average Power Ratio (PAPR)). For example, switching from pre-define performance trade-off state V1 to pre-define performance trade-off state V2 (i.e., changing the 2.4 GHz RF radio from 4×4 to 2×2) may cause in the proximity of 2.4 GHz RF radio to 6 GHz RF radio a drop in temperature at the 6 GHz radio of 13 degrees Celsius. In FIG. 5, Tc (i.e., case temperature) may comprise the temperature of the case of the semiconductor device. TJ (i.e., operating junction temperature) may comprise the temperature of the device circuit itself under given operating conditions.

From stage 210, where the computing device (e.g., first AP 115 or controller 105) creates the plurality of heatmaps associating the plurality of component heat characteristics, of the plurality of components of the device (e.g., first AP 115), with the plurality of pre-defined performance trade-off states, method 200 may advance to stage 220 where the computing device may determine a shortest path through the plurality of pre-defined performance trade-off states. For example, embodiments of the disclosure may estimate a shortest path to achieve a performance trade-off state of surrounding components to meet a TX performance target at a POI. This may be based on training knowledge instead of going through every possible combination.

Once the computing device determine the shortest path through the plurality of pre-defined performance trade-off states in stage 220, method 200 may continue to stage 230 where the computing device may iteratively place the device (e.g., first AP 115) in successive ones of the plurality of pre-defined performance trade-off states according to the determined shortest path until a Transmit (TX) performance target is met. For example, first AP 115 may have prominent high power draw and temperature areas where performance may be optimized based on pre-defined trade-off states thus lowering temperature at point of interest and the surrounding areas. This may work based on an ambient temperature predicted for each component and a pre-measured PA linearity (i.e., Pout versus EVM at frequency/BW/MCS/Temp) response. This iterative process may be performed on a per radio and a per client device basis.

Embodiments of the disclosure may provide a recursive process in which the temperature at a POI (e.g., RF Area or PA) may be lowered with granularity to improve TX RF performance (e.g., throughput, TX linearity-gain, EVM (MCS (7-13)), mask, and Peak-to-Average Power Ratio (PAPR)) to achieve higher QAMs and to increase throughput.

A radio operation state (TX×RX: SS at MCS) may be identified and the EVM required to sustain a link budget for each client device associated for all radios. Client devices may be identified that may be rate shifting down based on Dynamic Rate Adjustments (DRA) and retires. Then the link budget (e.g., TX Power/MCS/EVM) may be calculated to sustain a higher data rate. Based on the link budget for the higher data rate, a TX performance target for TX RF parameters (e.g., TX EVM) for a particular radio may be determined. Depending on the TX performance target, embodiments of the disclosure may estimate a shortest path to achieve a performance trade-off state of surrounding components to meet the TX performance target at a POI. This may be based on training knowledge instead of going through every possible combination. The shortest path may depend on the TX performance target, impact zone surrounding, corresponding pre-defined state, and efficacy of the pre-defined state to meet the target.

As stated above, embodiments of the disclosure may provide a recursive process where the temperature at a POI may be lowered with granularity to improve TX RF performance. For example, the BB chip and the PHY chip may be operating at a high temperature. The RF area may be operating approximately 6 degrees Celsius lower compared to the BB chip and the PHY chip. The above temperature delta may go higher when operating in multi radio, high Bandwidth (BW) with traffic user. A raise in temperature delta may occur when changing from 5G-4×4 to 5G-8×8. The lower TX EVM to meet the higher data rate may depend on a higher SNR (link budget) needed for a particular client device. Depending on the position of the client device (near), embodiments of the disclosure may move first AP 115 to a trade-off state of 5G-2×2:2 to meet the higher data rate and also trigger surrounding components to trade-off states. Once the computing device iteratively places the device (e.g., first AP 115) in successive ones of the plurality of pre-defined performance trade-off states according to the determined shortest path until the TX performance target is met in stage 230, method 200 may then end at stage 240.

Figure 6:
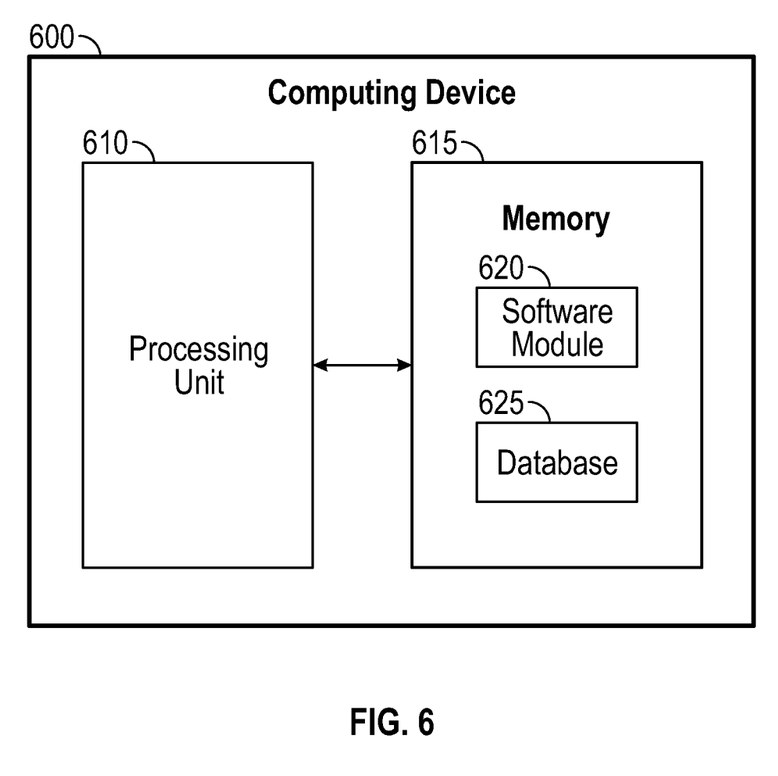
FIG. 6 is a block diagram of a computing device.

FIG. 6 shows computing device 600. As shown in FIG. 6, computing device 600 may include a processing unit 610 and a memory unit 615. Memory unit 615 may include a software module 620 and a database 625. While executing on processing unit 610, software module 620 may perform, for example, processes for improving RF performance by optimizing temperature as described above with respect to FIG. 2. Computing device 600, for example, may provide an operating environment for controller 105, first AP 115, first client device 120, second client device 125, third client device 130, or fourth client device 135. Controller 105, first AP 115, first client device 120, second client device 125, third client device 130, or fourth client device 135 may operate in other environments and are not limited to computing device 600.

Computing device 600 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples and computing device 600 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 600 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   creating a plurality of heatmaps associating a plurality of component heat characteristics, of a plurality of components of a device, with a plurality of pre-defined performance trade-off states;
   determining a shortest path through the plurality of pre-defined performance trade-off states; and
   iteratively placing the device in successive ones of the plurality of pre-defined performance trade-off states according to the determined shortest path until a Transmit (TX) performance target is met.

2. The method of claim 1, wherein the plurality of components comprise any combination of two or more of a Base Band (BB) Chip, a Radio Frequency Integrated Circuit (RFIC), a Physical Layer (PHY) chip, a memory chip, a Power Amplifier (PA), and a Power Management Integrated Circuit (PMIC).

3. The method of claim 1, wherein iteratively placing the device in successive ones of the plurality of pre-defined performance trade-off states is performed on a per radio basis of the device.

4. The method of claim 1, wherein iteratively placing the device in successive ones of the plurality of pre-defined performance trade-off states is performed on a per client device basis.

5. The method of claim 1, wherein iteratively placing the device in successive ones of the plurality of pre-defined performance trade-off states lowers a temperature for at least one Point of Interest (POI) in the device.

6. The method of claim 1, wherein the TX performance target comprises a predetermined Error Vector Magnitude (EVM) value.

7. The method of claim 1, wherein the device comprises an Access Point (AP).

8. A system comprising:
   a memory storage; and
   a processing unit coupled to the memory storage, wherein the processing unit is operative to:
   create a plurality of heatmaps associating a plurality of component heat characteristics, of a plurality of components of a device, with a plurality of pre-defined performance trade-off states;
   determine a shortest path through the plurality of pre-defined performance trade-off states; and
   iteratively place the device in successive ones of the plurality of pre-defined performance trade-off states according to the determined shortest path until a Transmit (TX) performance target is met.

9. The system of claim 8, wherein the plurality of components comprise any combination of two or more of a Base Band (BB) Chip, a Radio Frequency Integrated Circuit (RFIC), a Physical Layer (PHY) chip, a memory chip, a Power Amplifier (PA), and a Power Management Integrated Circuit (PMIC).

10. The system of claim 8, wherein the processing unit being operative to iteratively place the device in successive ones of the plurality of pre-defined performance trade-off states comprises the processing unit being operative to iteratively place the device in successive ones of the plurality of pre-defined performance trade-off states on a per radio basis of the device.

11. The system of claim 8, wherein the processing unit being operative to iteratively place the device in successive ones of the plurality of pre-defined performance trade-off states comprises the processing unit being operative to iteratively place the device in successive ones of the plurality of pre-defined performance trade-off states on a per client device basis.

12. The system of claim 8, wherein the processing unit being operative to iteratively place the device in successive ones of the plurality of pre-defined performance trade-off states lowers a temperature for at least one Point of Interest (POI) in the device.

13. The system of claim 8, wherein the TX performance target comprises a predetermined Error Vector Magnitude (EVM) value.

14. A non-transitory computer-readable medium that stores a set of instructions which when executed perform a method executed by the set of instructions comprising:
   creating a plurality of heatmaps associating a plurality of component heat characteristics, of a plurality of components of a device, with a plurality of pre-defined performance trade-off states;
   determining a shortest path through the plurality of pre-defined performance trade-off states; and
   iteratively placing the device in successive ones of the plurality of pre-defined performance trade-off states according to the determined shortest path until a Transmit (TX) performance target is met.

15. The non-transitory computer-readable medium of claim 14, wherein the plurality of components comprise any combination of two or more of a Base Band (BB) Chip, a Radio Frequency Integrated Circuit (RFIC), a Physical Layer (PHY) chip, a memory chip, a Power Amplifier (PA), and a Power Management Integrated Circuit (PMIC).

16. The non-transitory computer-readable medium of claim 14, wherein iteratively placing the device in successive ones of the plurality of pre-defined performance trade-off states is performed on a per radio basis of the device.

17. The non-transitory computer-readable medium of claim 14, wherein iteratively placing the device in successive ones of the plurality of pre-defined performance trade-off states is performed on a per client device basis.

18. The non-transitory computer-readable medium of claim 14, wherein iteratively placing the device in successive ones of the plurality of pre-defined performance trade-off states lowers a temperature for at least one Point of Interest (POI) in the device.

19. The non-transitory computer-readable medium of claim 14, wherein the TX performance target comprises a predetermined Error Vector Magnitude (EVM) value.

20. The non-transitory computer-readable medium of claim 14, wherein the device comprises an Access Point (AP).

\* \* \* \* \*